US006183630B1

(12) United States Patent
Reeves (10) Patent No.: US 6,183,630 B1
(45) Date of Patent: Feb. 6, 2001

(54) CHLORINATOR FOR AEROBIC WASTE TREATMENT SYSTEMS

(76) Inventor: Gary R. Reeves, Rte. 1 Box 368, Hockley, TX (US) 77447

( * ) Notice: Under 35 U.S.C. 154(b), the term of this patent shall be extended for 0 days.

(21) Appl. No.: 09/357,068

(22) Filed: Jul. 19, 1999

(51) Int. Cl.$^7$ .............................. B01D 17/12; B01D 11/02
(52) U.S. Cl. .................. 210/91; 210/137; 210/198.1; 422/264; 422/277; 422/278; 137/268
(58) Field of Search .................. 210/91, 97, 169, 210/198.1, 205, 206, 754, 85, 137; 422/37, 264, 265, 274–279, 282; 138/145, 146; 137/268

(56) References Cited

U.S. PATENT DOCUMENTS

| | | | |
|---|---|---|---|
| 3,411,981 | * 11/1968 | Thomas | 138/146 |
| 3,474,817 | * 10/1969 | Bates et al. | 210/169 |
| 4,100,073 | 7/1978 | Hopcroft | 210/170 |
| 4,210,624 | 7/1980 | Price | 422/264 |
| 4,584,106 | 4/1986 | Held | 422/264 |
| 4,759,907 | * 7/1988 | Kawolics et al. | 422/264 |
| 5,089,127 | * 2/1992 | Junker et al. | 422/264 |
| 5,207,896 | 5/1993 | Graves | 210/109 |
| 5,350,512 | 9/1994 | Tang | 422/264 |
| 5,405,540 | 4/1995 | Tang | 210/754 |
| 5,885,446 | * 3/1999 | Mcgrew | 210/91 |
| 5,932,093 | * 8/1999 | Chulick | 210/169 |
| 6,066,252 | * 5/2000 | Reeves | 210/91 |
| 6,077,484 | * 6/2000 | Graves | 422/277 |

* cited by examiner

Primary Examiner—Joseph W. Drodge
(74) Attorney, Agent, or Firm—Keeling Law Firm (57) ABSTRACT

A chlorinator for aerobic waste treatment systems that is in functional attachment with a waste stream and that includes a plurality of chlorine tablets therein. The chlorinator includes a cylinder portion that has a plurality of openings therethrough providing fluid communication between the waste stream and the plurality of chlorine tablets so that the waste stream comes into contact with all surfaces of at least one of the chlorine tablets. The cylinder portion of the chlorinator also includes an inner surface which has a coating that is non-reactive with the chlorine tablets and that enables the chlorine tablets to slide thereon. The waste stream comprises septic wastewater, which originates from toilet systems, and grey wastewater, which originates from somewhere other than toilet systems. The chlorinator also includes a device for selectively treating the septic wastewater with the chlorine tablets and not treating the grey wastewater with the chlorine tablets. In the preferred embodiment, a device for selectively treating comprises a passageway that provides fluid communication between the upstream side of the waste stream and the base portion of the chlorinator without directing any of the relevant fluid through the cylinder portion.

17 Claims, 4 Drawing Sheets

CHLORINATOR FOR AEROBIC WASTE TREATMENT SYSTEMS

BACKGROUND OF THE INVENTION

1. Field of Invention

This invention is generally aimed at chlorinators for aerobic waste treatment systems. More specifically, this invention is a chlorinator for an aerobic waste treatment system that allows the associated wastewater flow to contact all sides of at least one of the chlorine tablets held by the chlorinator, that includes a mechanism which ensures that the chlorine tablets slide and do not become lodged therein even after substantial use, and that is selective as to which type of wastewater is chlorinated thereby saving resources.

2. Related Art

Chlorinators are known to the prior art. Illustrative of such chlorinators are U.S. Pat. No. 4,100,073 issued to Hopcroft on Jul. 11, 1978; U.S. Pat. No. 4,210,624 issued to Price on Jul. 1, 1980; U.S. Pat. No. 4,584,106 issued to Held on Apr. 22, 1986; U.S. Pat. No. 5,207,896 issued to Graves on May 4, 1993; U.S. Pat. No. 5,350,512 issued to Tang on Sep. 27, 1994; and U.S. Pat. No. 5,405,540 issued to Tang on Apr. 11, 1995.

Typical prior art chlorinators include a cylinder portion which holds a plurality of chlorine tablets. Normally, the lowermost chlorine tablet is the chlorine tablet that primarily actively treats the wastewater. The lowermost tablet usually rests on the lowermost end of the cylinder portion, which lowermost end typically has no openings therethrough. Because the lowermost end of the cylinder portion of a prior art chlorinator typically has no openings therethrough, the lowermost tablet does not come into contact with the wastewater flow on its underside, namely the surface of the chlorine tablet that abuts the lowermost end of the cylinder portion. The treatment and chlorination of the wastewater flow would be enhanced and increased if the wastewater flow would come into contact with all sides of at least one of the chlorine tablets, namely the lowermost chlorine tablet. Therefore, it would be beneficial to the prior art to provide a chlorinator that allows the associated wastewater flow to contact all sides of at least one of the chlorine tablets held by the chlorinator.

In many prior art chlorinators, the chlorine tablets become lodged to the inside surface of the cylinder portion, preventing the proper operation of the chlorinator. It is important that the chlorine tablets slide and do not stick inside the cylinder portion of the chlorinator. This is important not only when the chlorine tablets are initially inserted, but also as the lowermost tablet dissolves allowing the other tablets to slide down by gravity towards the lowermost end of the cylinder portion. The prior art would therefore benefit from a chlorinator that includes a mechanism which ensures that the chlorine tablets slide and do not get stuck to the inside surface of the cylinder portion even after substantial use. It would be further beneficial to the prior art if such mechanism does not react with the chlorine tablets thereby enabling the chlorine tablets to retain their relevant treatment properties.

Prior art chlorinators typically also treat all of the waste that flows through the attached waste stream. However, under current laws and regulations, not all of the waste flowing through waste streams needs to be chlorinated. Generally speaking, the waste transported within waste streams typically comprises septic wastewater and gray wastewater. Septic wastewater is defined as waste that originates from toilet systems and as a result of toilet flushes. Gray wastewater comprises all other wastes originating somewhere other than from toilet systems. Under current laws and regulations, only septic wastewater needs to be treated by a chlorinator and chlorine tablets. Therefore, in order to conserve resources and increase the life of the chlorine tablets, it would be beneficial to the prior art to provide a chlorinator that is selective as to which type of wastewater is chlorinated. Furthermore, the prior art would benefit from a chlorinator that selectively treats septic wastewater but does not treat gray wastewater.

SUMMARY OF THE INVENTION

Accordingly, the objects of my invention is to provide, inter alia, a chlorinator for aerobic waste treatment systems that:

allows the associated wastewater flow to contact all sides of at least one of the chlorine tablets held by the chlorinator;

includes a mechanism which ensures that the chlorine tablets slide and do not get lodged to the inside surface of the cylinder portion even after substantial use;

includes a mechanism as previously noted which does not react with the chlorine tablets thereby enabling the chlorine tablets to retain their relevant treatment properties;

is selective as to which type of wastewater is chlorinated; and selectively treats septic wastewater but does not treat gray wastewater.

Other objects of my invention will become evident throughout the reading of this application.

My invention is a chlorinator for aerobic waste treatment systems that is in functional attachment with a waste stream and that includes a plurality of chlorine tablets therein. The chlorinator includes a cylinder portion that has a plurality of openings therethrough providing fluid communication between the waste stream and the plurality of chlorine tablets so that the waste stream comes into contact with all surfaces of at least one of the chlorine tablets. The cylinder portion of the chlorinator also includes an inner surface which has a coating that is non-reactive with the chlorine tablets and that enables the chlorine tablets to slide thereon. The waste stream comprises septic wastewater, which originates from toilet systems, and grey wastewater, which originates from somewhere other than toilet systems. The chlorinator also includes a means for selectively treating the septic wastewater with the chlorine tablets and not treating the grey wastewater with the chlorine tablets. In the preferred embodiment, means for selectively treating comprises a passageway that provides fluid communication between the upstream side of the waste stream and the base portion of the chlorinator without directing any of the relevant fluid through the cylinder portion.

DESCRIPTION OF THE INVENTION

The chlorinator 10 is shown in FIGS. 1–5 as 10. Chlorinator 10 is in functional attachment with a waste stream 12 and, while in use, typically includes a plurality of chlorine tablets 14 therein. Waste stream 12 includes an upstream side, from where the relevant fluid enters chlorinator 10, and a downstream side, from where the relevant fluid exits chlorinator 10. Typically, chlorinator 10 is suspended within a pump tank, and waste stream 12 comprises septic wastewater as well as gray wastewater. Septic wastewater is defined as waste that originates from toilet systems. Gray wastewater comprises all other wastes originating somewhere other than from toilet systems. Generally and in the preferred embodiment, chlorinator 10 includes a cylinder portion 20 and a base portion 80. Preferably, chlorinator 10 also includes a means for selectively treating 140 the septic wastewater with the chlorine tablets 14 and not treating the gray wastewater with the chlorine tablets 14.

Figure 2:
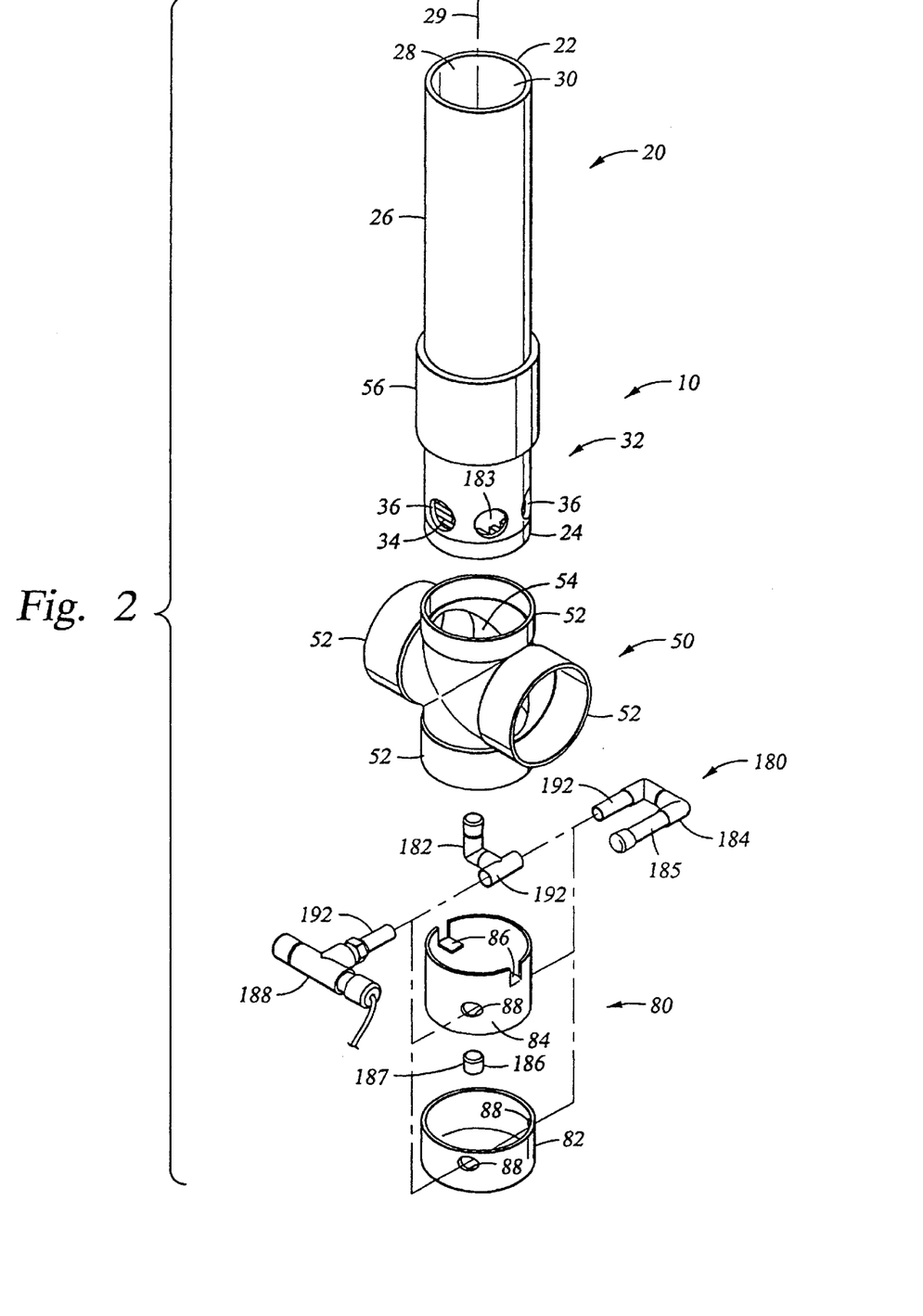
FIG. 2 is an exploded isometric view of the chlorinator.

In the preferred embodiment, cylinder portion 20 includes a first end 22, a second end 24, an outer surface 26, and an inner surface 28. First and second ends, 22 and 24, correspond to the circular ends of the generally cylindrical shape. First end 22 is proximate or above ground level 16. Second end 24 is distal to or below ground level 16. Cylinder portion 20 is hollow thereby defining an open interior 30. Chlorine tablets 14 are held within cylinder portion interior 30. Cylinder portion 20 further includes a longitudinal axis 29 running axially lengthwise through cylinder portion 20.

Cylinder portion 20 includes a plurality of openings 32 which provide fluid communication between the waste stream 12 and the cylinder portion interior 30. In the preferred embodiment, the openings 32 provide fluid communication as previously stated so that waste stream 12 comes into contact with all surfaces of at least one chlorine tablet 14 held within cylinder portion interior 30. Also preferably, the openings 32 are proximate cylinder portion second end 24.

Figure 3:
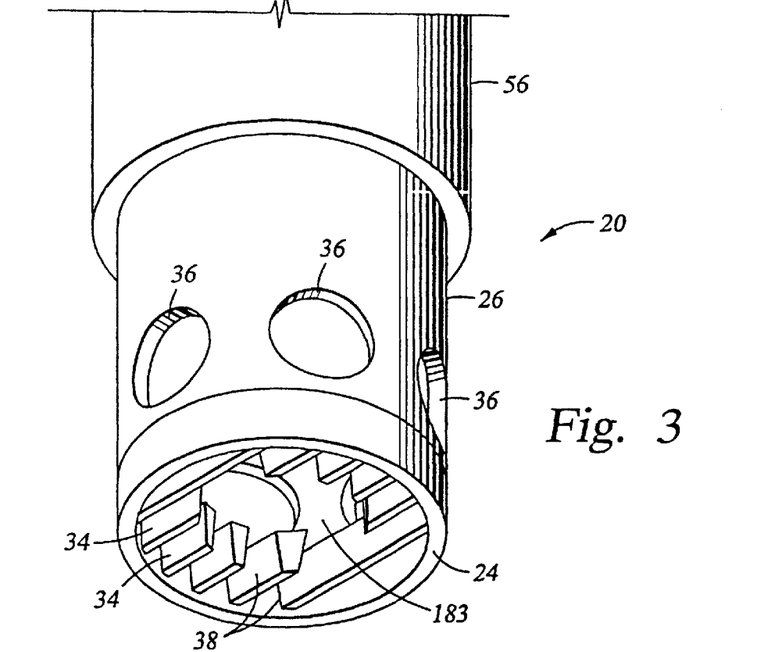
FIG. 3 is an isometric view of the second end of the cylinder portion.

Preferably, plurality of openings 32 comprises a plurality of passages 34 and a plurality of holes 36. Passages 34 are defined on cylinder portion second end 24 thereby allowing fluid communication therethrough between cylinder portion interior 30 and the exterior of cylinder portion 20. Holes 36 are defined on cylinder portion outer surface 26 proximate cylinder portion second end 24 thereby allowing fluid communication therethrough between cylinder portion interior 30 and the exterior of cylinder portion 20. In the preferred embodiment, passages 34 comprise a plurality of slits 38 defined on cylinder portion second end 24. In the preferred embodiment, holes 36 comprise a plurality of holes equally spaced about cylinder portion longitudinal axis 29.

In the preferred embodiment, cylinder portion inner surface 28 includes a coating 40 that is non-reactive to the chlorine tablets 14 and that creates a slippery surface for the chlorine tablets 14 so that the chlorine tablets 14 slide thereon. Thereby, coating 40 prevents the chlorine tablets 14 from sticking to the cylinder portion inner surface 28 as the higher tablets 14 gravitate downward within cylinder portion 20. In the preferred embodiment, coating 40 comprises a coating layer of polyurethane.

Chlorinator 10 preferably comprises a 4-way joint portion 50 intermediate cylinder portion 20 and base-portion 80. Joint portion 50 includes four inlets 52, each leading to a central interior region 54. In the preferred embodiment, the four inlets 52 comprise two sets of opposing inlets 52. In general, cylinder portion 20 and base portion 80 are attached to two opposing inlets 52, and waste stream 12 is attached to the remaining two opposing inlets 52.

The attachment of cylinder portion 20 to its inlet 52 is preferably a sliding frictional attachment. The frictional fit between cylinder portion 20 and its inlet 52 is preferably aided by the addition of an annular filler 56. Annular filler 56 is attached to the cylinder portion outer surface 26 in one embodiment and to the inlet 52 in another embodiment.

The attachment of base portion 80 to its inlet 52 is preferably also a sliding frictional attachment. In the preferred embodiment, base portion 80 comprises a base cap 82 and an annular coupling 84. Essentially, the respective inlet 52 is slidingly frictionally attached to one end of annular coupling 84, and base cap 82 is slidingly frictionally attached to the other end of annular coupling 84.

The attachment of waste stream 12 to its two inlets 52 can be one of any number of types known in the prior art. For purposes of ease of installation and removability, the attachment is preferably also a sliding frictional fit. Preferably, the waste stream 12 is slidingly frictionally attached to each of the relevant two opposing inlets 52.

Figure 5:
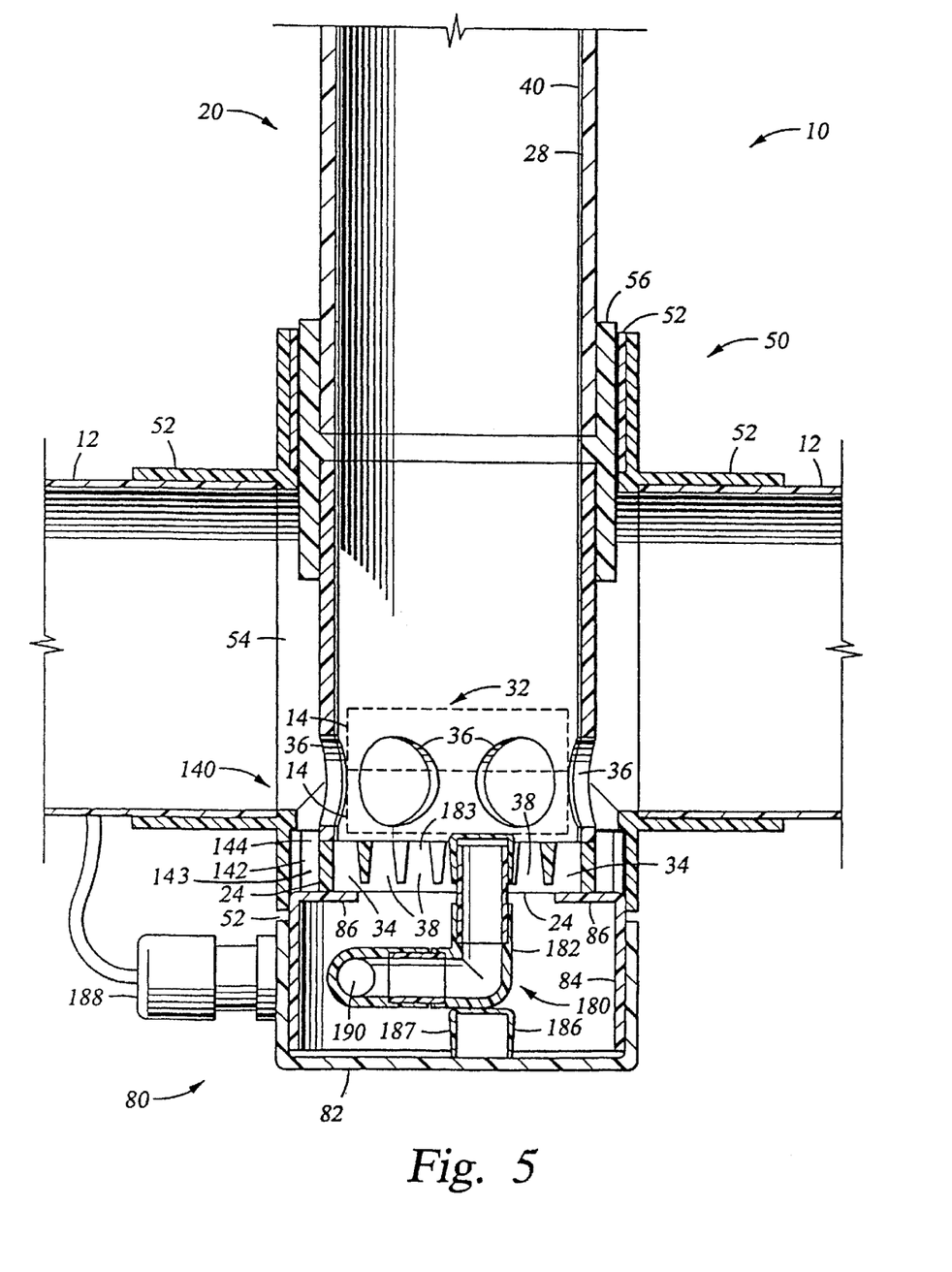
FIG. 5 is a cross-sectional view of the chlorinator functionally attached to a waste stream.

As best shown in FIG. 5, the attachment of cylinder portion 20 to its inlet 52 is such that the holes 36 are situated within central interior region 54 proximate base portion 80. In addition, the attachment of cylinder portion 20 to its inlet 52 is such that cylinder portion second end 24 rests on a plurality of base portion tabs 86. Base portion tabs 86 are inwardly pointed tabs defined from annular coupling 84. Therefore, in the preferred embodiment, cylinder portion 20 and all other relevant items are constructed so that the holes 36 are situated within central interior region 54 when cylinder portion second end 24 rests on tabs 86.

Means for selectively treating 140 selectively treats the septic wastewater with the chlorine tablets 14 and does not treat the gray wastewater with the chlorine tablets 14. In the preferred embodiment, means for selectively treating 140 comprises a passageway 142 that provides fluid communication between the upstream side of waste stream 12 and base portion 80 without directing any of the relevant fluid through cylinder portion 20. In the preferred embodiment, passageway 142 comprises an annular space 144. In this embodiment, cylinder portion 20 is constructed so that annular space 144 is defined between cylinder portion outer surface 26 adjacent cylinder portion second end 24 and the inlet 52 corresponding to base portion 80. Therefore, the outer cross-sectional diameter of cylinder portion 20 adjacent cylinder portion second end 24 is smaller than the inner cross-sectional diameter of the inlet 52 corresponding to base portion 80.

Figure 4:
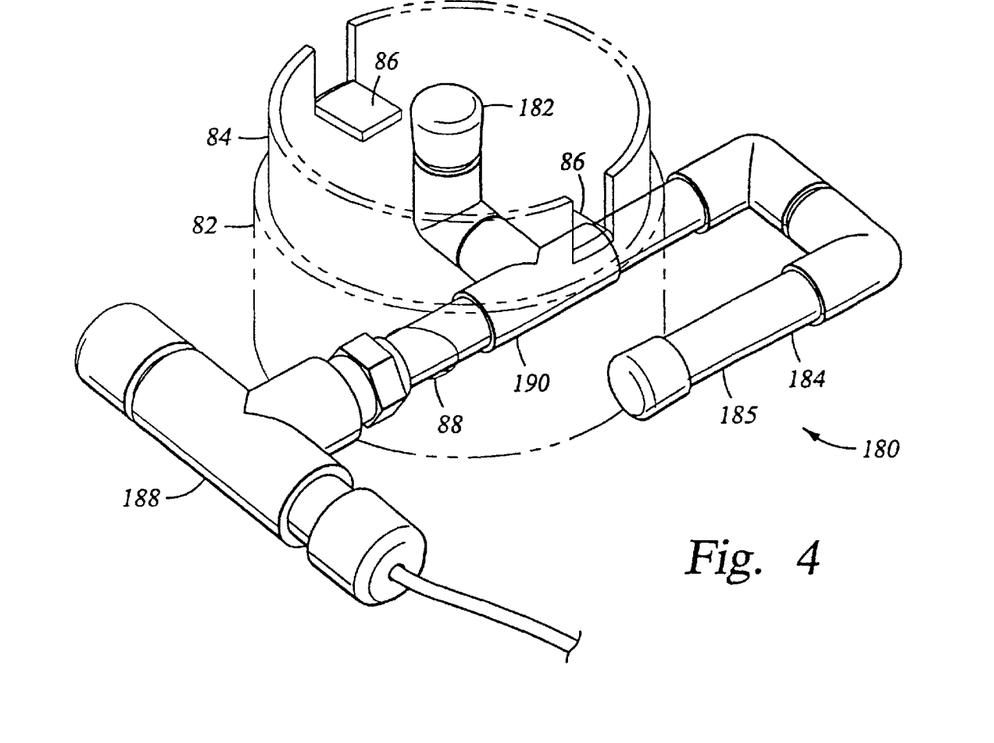
FIG. 4 is an isometric view of the means for sensing with the attached base portion in phantom lines.

Chlorinator 10 may also include a means for sensing 180 the presence of chlorine tablets 14 within cylinder portion 20. In the preferred embodiment, means for sensing 180 comprises a sensor 188 pivotally attached to base portion 80. Sensor 188 senses when its pivotal movement has passed a certain pre-determined point which indicates that the chlorine tablets 14 have been dissolved. Preferably, means for sensing 180 comprises a prong 182, a forward stop 184, and sensor 188 pivotally attached to base portion 80, preferably to base cap 82. In the preferred embodiment, means for sensing 180 also comprises a backward stop 186.

Prong 182 is preferably a vertical member directly underneath cylinder portion second end 24. In fact, the top end of prong 182 preferably protrudes into cylinder portion second end 24 through a cylinder portion second end hole 183, which itself is preferably axially aligned in relation to cylinder portion second end 24. Prong 182 is pivotally attached to base portion 80 by way of a pivoting arm 190 which extends through at least one but preferably a plurality of holes 88 on base portion 80 (either only on base cap 82 or on both base cap 82 and annular coupling 84, depending on the embodiment). In the preferred embodiment, holes 88 are slightly oversized in relation to pivoting arm 190 so as to allow fluid communication therethrough when pivoting arm 190 is situated therein. As best seen in FIG. 2, pivoting arm 190 can be comprised from a plurality of connectable appendages 192.

Forward stop 184 is attached to one side of pivoting arm 190 exterior of base portion 80. Forward stop 184 prevents prong 182 from pivoting forward, or vertically upwards, past a certain point. In the preferred embodiment, forward stop 184 comprises a stop arm 185 that extends from one side of pivoting arm 190 exterior of base portion 80 back in the direction of longitudinal axis 29 on the side of pivoting arm 190 opposite prong 182. Thus, at a certain point during the forward, or vertically upwards, pivoting motion of prong 182, stop arm 185 will contact base portion 80 thereby stopping any further pivoting motion.

Sensor 188 is preferably attached to the side of pivoting arm 190 opposite forward stop 184, preferably also exterior to base portion 80. Sensor 188 senses when prong 182 has pivoted forward, or vertically upwards, past a certain point, at which point sensor 188 transmits a signal to a user indicating such occurrence. In the preferred embodiment, sensor 188 comprises a mercury switch (not shown) which senses rotational movement in the pivoting arm 190.

Backward stop 186 is preferably attached to the interior of base cap 82 directly underneath prong 182. Backward stop 186 prevents prong 182 from pivoting backward, or vertically downwards, past a certain point. In the preferred embodiment, backward stop 186 comprises a stop knob 187. Stop knob 187 is preferably attached to the interior of base cap 82 and is axially aligned therewith. Thus, at a certain point during the backward, or vertically downwards, pivoting motion of prong 182, the bottom end of prong 182 will contact stop knob 187 thereby stopping any further pivoting motion. In addition, stop knob 187 and prong 182 are preferably sized and constructed so that when prong 182 rests on stop knob 187 the top end of prong 182 protrudes into cylinder portion second end 24 through cylinder portion second end hole 183.

IN OPERATION

Figure 1:
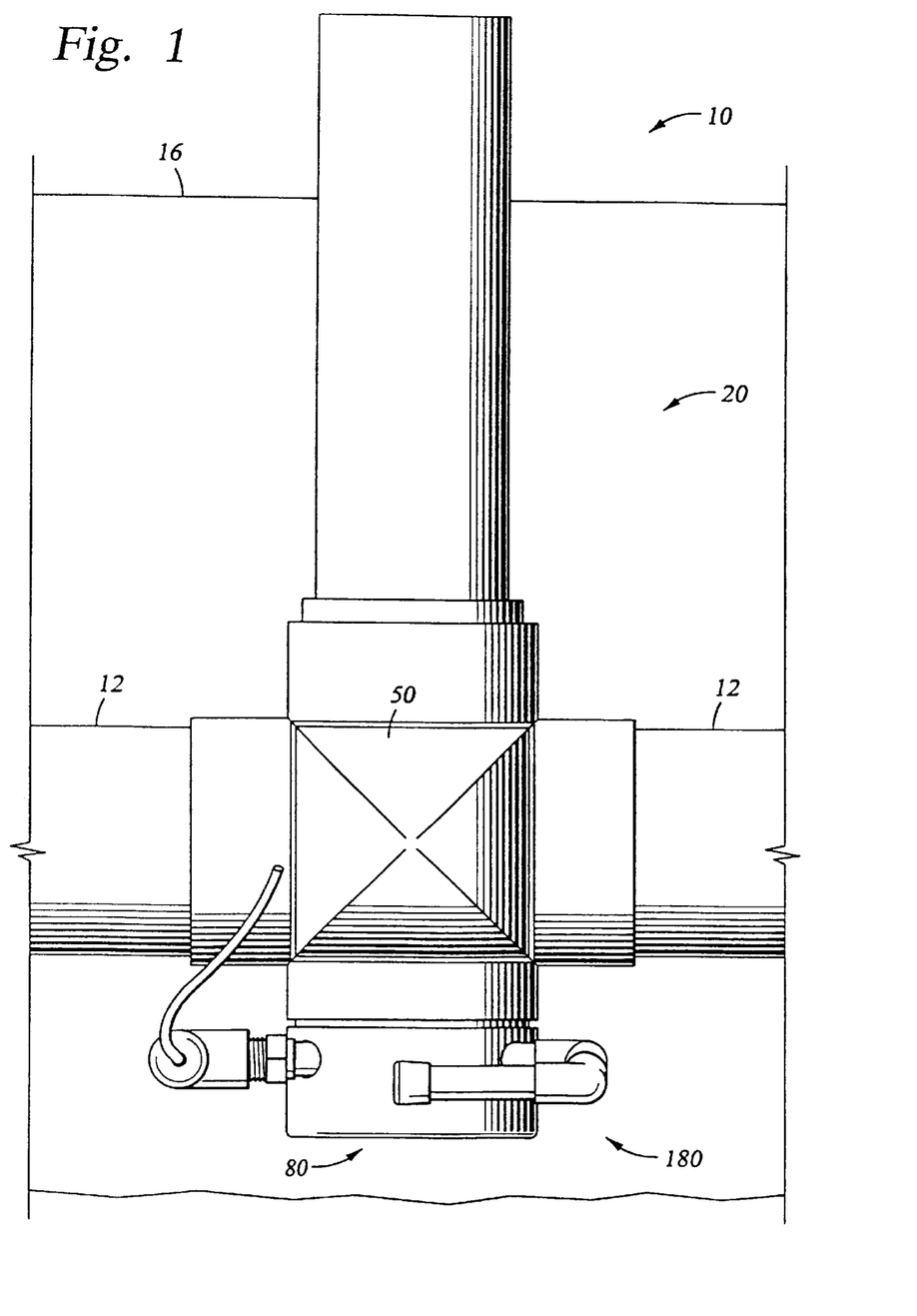
FIG. 1 is an elevational view of the chlorinator buried in the ground and functionally attached to a waste stream.

In operation, assuming that chlorinator 10 is already properly connected to waste stream 12, cylinder portion first end 22 is situated above ground 16, and chlorine tablets 14 have not yet been inserted into cylinder portion 20, a user must first insert chlorine tablets 14 into cylinder portion 20 through cylinder portion first end 22. As each chlorine tablet 14 is inserted through cylinder portion first end 22, it descends by gravity down cylinder portion 20 towards cylinder portion second end 24. Due to the inclusion of coating 40 on cylinder portion inner surface 28, the chlorine tablets 14 simply slide on cylinder portion inner surface 28 and do not stick thereto.

The first chlorine tablet 14 inserted into cylinder portion 20 falls to cylinder portion second end 24 and comes to rest thereon. In addition, since it is resting on cylinder portion second end 24, the first chlorine tablet 14 also rests on the top end of prong 182, which protrudes into cylinder portion second end 24 through cylinder portion second end hole 183. It is noted that when chlorine tablet 14 rests on prong 182, the weight of chlorine tablet 14 on prong 182 may cause pivot arm 190 to pivot at least a small amount backward, or vertically downwards. However, due to the inclusion of stop knob 187, prong 182 cannot pivot backward past the point at which prong 182 contacts stop knob 187. Once a sufficient number of chlorine tablets 14 are inserted in cylinder portion 20, chlorinator 10 is ready for normal use.

During normal use, waste stream 12 is not perpetually filled with waste. Instead, the flow of waste through waste stream 12 is in batches, with the occurrence of the batches being directly dependent on the activity within the house or building serviced by the waste stream 12. In other words, one batch of waste will flow through the waste stream 12 during the time a person is taking a shower or directly after a person has flushed a toilet. No batches of waste will flow when there is no relevant activity inside the house or building.

Importantly, the type of activity within the house or building also dictates the volume and flow rate of each batch. For instance, a toilet flush produces a batch of waste through waste stream 12 that has a very large volume and a very fast flow rate. On the other hand, the majority of other activities, including a person bathing or washing his/her hands, produces a batch of waste through waste stream 12 that has a relatively small volume and a relatively slow flow rate.

Also importantly and as previously disclosed, the waste transported within waste stream 12 typically comprises septic wastewater as well as gray wastewater. Septic wastewater is defined as waste that originates from toilet systems and as a result of toilet flushes. Gray wastewater comprises all other wastes originating somewhere other than from toilet systems.

Putting the two concepts together then, toilet flushes generate batches of septic wastewater that have a very large volume and that have a very fast flow rate. On the other hand, most other activities generate batches of gray wastewater that have a relatively small volume and a relatively slow flow rate. Under current laws and regulations, only septic wastewater needs to be treated by chlorinator 10 and chlorine tablets 14.

Means for selectively treating 140 selectively treats the batches of septic wastewater which result from toilet flushing with the chlorine tablets 14 and selectively does not treat the batches of gray wastewater which result from most all other activities. In general, because batches of gray wastewater have a relatively small volume and a relatively slow flow rate (about ¼–½ gallon per minute), such gray wastewater "trickles" through the upstream side of waste stream 12 towards chlorinator 10. Not having much impulse, the gray wastewater then falls in the passageway 143, or annular space 144 in the preferred embodiment, instead of continuing through the cylinder portion openings 32. After flowing through the passageway 143, or annular space 144 in the preferred embodiment, the gray wastewater falls by gravity to the base portion 80. After reaching the base portion 80, the gray wastewater flows through the oversized holes 88 out of chlorinator 10 and drops into the pump tank that houses chlorinator 10. On the other hand, because batches of septic wastewater have a large volume and a fast flow rate (about ½–10 gallons per minute), such septic wastewater "barrels" through the upstream side of waste stream 12 towards chlorinator 10. Having a large quantity of impulse, the septic wastewater flows through the cylinder portion openings 32 and the majority of it continues on to the downstream side of waste stream 12, instead of falling in the passageway 143.

On average, only about 20% of the wastewater that flows through waste stream 12 comprises septic wastewater, with the remaining 80% comprising gray wastewater. Therefore, the means for selectively treating 140 in essence only treats 20% of the total wastewater that flows through waste stream 12. As previously stated, only septic wastewater, or 20% of the overall wastewater flow, needs to be treated by chlorine tablets 14. By being able to selectively treat only such 20% of the wastewater, chlorinator 10 greatly increases the life of the chlorine tablets 14 since such tablets 14 are not subjected to the remaining 80% of the wastewater flow.

The flow of the septic wastewater through the cylinder portion openings 32 and within the cylinder portion interior 30 is essentially a three dimensional flow. The flow enters cylinder portion 20 through the cylinder portion holes 36. Within cylinder portion interior 30, the flow of septic wastewater also falls into cylinder portion passages 34, or cylinder portion slits 38 in the preferred embodiment. A chlorine tablet 14 resting on cylinder portion second end 24 will therefore be surrounded by the flow of septic wastewater on all of its sides, including its underside which is adjacent the cylinder portion passages 34, or cylinder portion slits 38 in the preferred embodiment. The septic wastewater is treated by the chlorine tablets 14 as it contacts the chlorine tablets 14. Because the septic wastewater flow contacts all sides of at least the lowermost chlorine tablet 14, the rate and efficiency of treatment or chlorination is faster and better than if the septic wastewater flow would not contact all sides of at least the lowermost chlorine tablet 14 (as is the case in prior art chlorinators).

After contacting the chlorine tablets 14, the majority of the septic wastewater flow continues out of cylinder portion 20 through the cylinder portion holes 36 that are adjacent the downstream side of waste stream 12. Once out of the cylinder portion 20, the septic wastewater is now treated and chlorinated in accordance with the laws and regulations and continues through the downstream side of waste stream 12. Notably, the portion of septic wastewater that fell into cylinder portion passages 34 (or cylinder portion slits 38 in the preferred embodiment) falls by gravity to the base portion 80 and continues out of chlorinator 10 through oversized holes 88.

As more septic wastewater contacts the chlorine tablets 14, the chlorine tablets 14 become smaller, losing chlorine molecules during the chlorination process. With respect to the lowermost chlorine tablet 14, such chlorine tablet 14 remains supported by the top end of prong 182 even after it is smaller in cross-section than the cylinder portion second end hole 183. Therefore, by maintaining chlorine tablet 14 in contact with the septic wastewater flow, chlorinator 10 is able to extract all possible use of each chlorine tablet 14.

As the lowermost chlorine tablet 14 becomes smaller, the chlorine tablet 14 that is directly above it falls by gravity towards cylinder portion second end 24, eventually taking the place of the lowermost chlorine tablet 14. Due to the inclusion of coating 40 on cylinder portion inner surface 28, the chlorine tablets 14 simply slide on cylinder portion inner surface 28 and do not stick thereto. In addition, the sliding and non-stick action enabled by the coating 40 continues even after the chlorinator 10 has been in use for a substantial period of time. It is further noted that coating 40 does not react with the chlorine tablets 14; therefore, the chlorine tablets 14 retain their treatment properties even after time and substantial use.

Prong 182 is constructed to be semi-floatable so that it tends to float when wastewater surrounds it within base portion 80. When chlorine tablets 14 rest on the top end of prong 182, the weight of the tablets 14 acts to maintain the bottom end of prong 182 against stop knob 187 and prevents prong 182 from floating.

Once the last chlorine tablet 14 is dissolved, since there is no more weight acting upon prong 182, semi-floatable prong 182 floats up when wastewater enters base portion 80, causing pivoting arm 190 to pivot forward, or vertically upwards. Means for sensing 180 is constructed so that once prong 182 pivots past a certain, pre-determined point, prong 182 remains in its pivoted forward position, with stop arm 185 abutting base portion 80 thereby preventing any further forward pivoting motion. In other words, once prong 182 pivots past the certain, pre-determined point, prong 182 does not return to its original position abutting stop knob 187 even after the wastewater has exited chlorinator 10.

After prong 182 pivots forward past the certain, pre-determined point, sensor 188 senses this pivoting motion and transmits a signal to a user indicating that the last chlorine tablet 14 has dissolved. In the preferred embodiment, while the chlorinator 10 is functioning properly with chlorine tablets 14 therein, sensor 188 maintains a signal light "on" for the user. Once the last tablet 14 is dissolved, sensor 188 preferably turns such signal light "off". Therefore, when a user notices that the signal light is "off", the user knows that either the tablets 14 have been dissolved, the sensor 188 is malfunctioning, or the tablets 14 are not sliding properly within chlorinator 10.

In order to comply with the laws and regulations, the wastewater that passes through chlorinator 10 should have a chlorine per gallon content of approximately one. The chlorine content of the wastewater can be controlled to be within regulation by changing the size of the cylinder portion openings 32, including cylinder portion passages 34 and cylinder portion holes 36. It has been found through experimentation that the following combinations generally generate the appropriate chlorine per gallon content in the treated wastewater:

a.) for a daily wastewater volume of 250 gallons, cylinder portion holes 36 should be approximately 1¼" in diameter;

b.) for a daily wastewater volume of 500 gallons, cylinder portion holes 36 should be approximately 1" in diameter;

c.) for a daily wastewater volume of 750 gallons, cylinder portion holes 36 should be approximately ¾" in diameter; and d.) for a daily wastewater volume of 1000 gallons, cylinder portion holes 36 should be approximately ½" in diameter.

As previously disclosed, in the preferred embodiment, cylinder portion 20 is slidingly frictionally attached to its respective inlet 52. Thus, cylinder portion 20 can be removed from four way joint portion 50 simply by lifting it out of inlet 52. When ready to reattach cylinder portion 20, a user simply reinserts cylinder portion 20 within its respective inlet 52. Although at this point prong 182 may be pivoted forwards, or vertically upwards, stop arm 185 prevents it from pivoting past a certain point. Such mechanisms should be constructed so that, at the point stop arm 185 stops the pivoting motion of prong 182, cylinder portion 20 can be inserted within inlet 52 and prong 182 easily falls within cylinder portion second end hole 183.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A chlorinator for aerobic waste treatment systems, comprising:

a cylinder portion adapted to hold a plurality of chlorine tablets therein;

said cylinder portion including a plurality of openings providing fluid communication between a waste stream and said plurality of chlorine tablets so that said waste stream comes in contact with at least one of said plurality of chlorine tablets;

said cylinder portion including a first end, a second end, and an outer surface;

said plurality of openings comprising a plurality of passages and a plurality of holes;

said cylinder portion second end including said plurality of passages allowing fluid communication therethrough;

said cylinder portion outer surface including said plurality of holes proximate said cylinder portion second end allowing fluid communication therethrough;

a joint portion functionally attached to said cylinder portion and to said waste stream;

said joint portion including a central interior region;

said plurality of holes located within said central interior region when said cylinder portion is functionally attached to said joint portion;

a base portion functionally attached to said joint portion;

said base portion including inwardly pointed base portion tabs; and said cylinder portion second end resting on said base portion tabs.

2. The chlorinator as in claim 1, further comprising a passageway providing fluid communication between the upstream side of said waste stream and said base portion without directing any of a relevant fluid through said cylinder portion.

3. The chlorinator as in claim 2, characterized by:

said cylinder portion having an outer cross-sectional diameter;

said joint portion including an inlet;

said base portion functionally attached to said inlet;

said inlet having an inner cross-sectional diameter;

said cylinder portion outer cross-sectional diameter at said cylinder portion second end being smaller than said inlet inner cross-sectional diameter thereby defining an annular space therebetween; and said passageway comprising said annular space.

4. The chlorinator as in claim 1, further comprising:

a means for sensing the presence of said chlorine tablets within said cylinder portion;

a joint portion functionally attached to said cylinder portion and to said waste stream;

a base portion functionally attached to said joint portion;

said means for sensing comprising a sensor pivotally attached to said base portion;

said sensor sensing when the pivotal movement has passed a certain pre-determined point; and said certain pre-determined point indicating that said chlorine tables having been dissolved.

5. The chlorinator as in claim 4, characterized by:

said means for sensing further comprising a prong;

said prong pivotally attached to said base portion;

said cylinder portion at said cylinder portion second end including a cylinder portion second end hole;

said prong protruding into said cylinder portion second end through said cylinder portion second end hole; and said sensor sensing when said prong has pivoted past said certain pre-determined point.

6. The chlorinator as in claim 5, characterized by said prong constructed to be semi-floatable.

7. The chlorinator as in claim 5, characterized by:

said means for sensing further comprising a pivoting arm;

said pivoting arm pivotally attached to said base portion; and said prong fixedly attached to said pivoting arm.

8. The chlorinator as in claim 7, characterized by:

said base portion including at least one hole therethrough;

said pivoting arm pivotally attached to said base portion through said at least one hole; and said at least one hole being slightly oversized in relation to said pivoting arm so as to allow fluid communication therethrough.

9. The chlorinator as in claim 8, characterized by:

said means for sensing further comprising a forward stop and a backward stop;

said forward stop limiting the forward or vertically upwards pivotal movement of said prong; and said backward stop limiting the backward or vertically downwards pivotal movement of said prong.

10. The chlorinator as in claim 1, further comprising:

said joint portion including four inlets;

each of said four inlets leading to said central interior region;

said four inlets comprising two sets of opposing inlets;

said cylinder portion and said base portion functionally attached to two of said opposing inlets; and said waste stream functionally attached to the remaining two of said opposing inlets.

11. The chlorinator as in claim 1, said plurality of passages providing fluid communication between the interior of said cylinder portion and said base portion.

12. A chlorinator for aerobic waste treatment systems, comprising:

a cylinder portion adapted to hold a plurality of chlorine tablets therein;

said cylinder portion in functional attachment with a waste stream;

said waste stream comprising gray wastewater and septic wastewater; and a means for selectively treating a higher flow rate of said septic wastewater with said plurality of chlorine tablets and not treating a lower flow rate of said gray wastewater with said plurality of chlorine tablets by diverting said lower flow rate by gravity from said cylinder portion.

13. The chlorinator as in claim 12, further comprising:

a joint portion functionally attached to said cylinder portion and said waste stream;

a base portion functionally attached to said joint portion; and said means for selectively treating comprising a passageway providing fluid communication between the upstream side of said waste stream and said base portion without directing any of a relevant fluid through said cylinder portion.

14. The chlorinator as in claim 13, characterized by:

said cylinder portion having an outer cross-sectional diameter;

said joint portion including an inlet;

said base portion functionally attached to said inlet;

said inlet having an inner cross-sectional diameter;

said cylinder portion outer cross-sectional diameter at said cylinder portion second end being smaller than said inlet inner cross-sectional diameter thereby defining an annular space therebetween; and said passageway comprising said annular space.

15. A chlorinator for aerobic waste treatment systems as in claim 1 or claim 12, characterized by:

said cylinder portion being slidingly frictionally attached to a waste water inlet.

16. The chlorinator as in claim 15, further comprising:

said cylinder portion being slidingly removable to afford insertion of said plurality of chlorine tablets into said cylinder portion; and said cylinder portion being slidingly frictionally reinsertable into said wastewater inlet when said plurality of chlorine tablets has been inserted into said cylinder portion.

17. The chlorinator for aerobic waste treatment systems as in claim 15, further comprising:

said plurality of openings being sized to provide proper throughput passage for a daily wastewater volume;

each of said plurality of openings being approximately 1¼" in diameter when said daily wastewater volume is approximately 250 gallons;

each of said plurality of openings being approximately 1" in diameter when said daily wastewater volume is approximately 500 gallons;

each of said plurality of openings being approximately ¾" in diameter when said daily wastewater volume is approximately 750 gallons; and each of said plurality of openings being approximately ½" in diameter when said daily wastewater volume is approximately 1000 gallons.

* * * * *